(12) United States Patent
Boding

(10) Patent No.: US 11,676,146 B2
(45) Date of Patent: Jun. 13, 2023

(54) SYSTEM AND METHOD FOR IDENTITY CHAINING

(71) Applicant: Visa International Service Association, San Francisco, CA (US)

(72) Inventor: B. Scott Boding, Mountain View, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 1172 days.

(21) Appl. No.: 16/229,674

(22) Filed: Dec. 21, 2018

(65) Prior Publication Data
US 2019/0180282 A1 Jun. 13, 2019

Related U.S. Application Data

(63) Continuation of application No. 13/628,628, filed on Sep. 27, 2012, now abandoned.

(60) Provisional application No. 61/695,674, filed on Aug. 31, 2012, provisional application No. 61/552,972, filed on Oct. 28, 2011.

(51) Int. Cl.
*G06Q 20/40* (2012.01)
(52) U.S. Cl.
CPC ..... *G06Q 20/4014* (2013.01); *G06Q 20/4016* (2013.01)
(58) Field of Classification Search
CPC .... G06Q 20/10; G06Q 20/40; G06Q 20/4014; G06Q 20/4016; G06Q 40/00; G06Q 40/25

USPC .............................................. 705/35, 38–45
See application file for complete search history.

(56) References Cited

U.S. PATENT DOCUMENTS

| 6,871,287 | B1 | 3/2005 | Ellingson |
| 9,058,607 | B2* | 6/2015 | Ganti ................. G06Q 30/0185 |
| 2007/0038560 | A1 | 2/2007 | Ansley |
| 2009/0061831 | A1 | 3/2009 | Shastry |

(Continued)

FOREIGN PATENT DOCUMENTS

| WO | 2008141168 | 11/2008 |
| WO | 2009137716 | 11/2009 |

OTHER PUBLICATIONS

Jha, S. (2009). Credit card fraud detection with discrete choice models and misclassified transactions (Order No. 3380699). Available from ProQuest Dissertations and Theses Professional. (305117460). Retrieved from https://dialog.proquest.com/professional/docview/305117460?accountid=131444 (Year: 2009).*

(Continued)

*Primary Examiner* — Hani M Kazimi
(74) *Attorney, Agent, or Firm* — Kilpatrick Townsend & Stockton LLP

(57) ABSTRACT

An identity chaining fraud detection method that allows each current transaction to be linked to other transactions through commonly shared identities. Over a period of time the links create a chain of associated transactions which can be analyzed to determine if identity variances occur, which indicates that fraud is detected. Additionally, if a specific identity is detected as being fraudulent, that identity can be tagged as fraudulent and can be referenced by a plurality of other merchant transaction chains to determine fraud.

20 Claims, 6 Drawing Sheets

(56) References Cited

U.S. PATENT DOCUMENTS

| | | | |
|---|---|---|---|
| 2009/0089869 A1* | 4/2009 | Varghese | G06F 21/566 726/7 |
| 2009/0157516 A1 | 6/2009 | Babu et al. | |
| 2010/0305993 A1* | 12/2010 | Fisher | G06Q 20/4016 706/47 |
| 2011/0016050 A1 | 1/2011 | Evans | |
| 2011/0218877 A1 | 9/2011 | Barber | |
| 2011/0251951 A1* | 10/2011 | Kolkowitz | G06Q 20/10 705/39 |
| 2012/0130853 A1* | 5/2012 | Petri | G06Q 30/0609 705/26.35 |
| 2012/0158585 A1 | 6/2012 | Ganti | |
| 2013/0103482 A1* | 4/2013 | Song | G06Q 30/02 705/14.26 |
| 2013/0110722 A1* | 5/2013 | Boding | G06Q 20/4014 705/44 |
| 2019/0342328 A1* | 11/2019 | Rivner | G06F 21/316 |

OTHER PUBLICATIONS

PCT/US2012/057619, "International Search Report & Written Opinion", dated Mar. 4, 2013, 9 pages.

* cited by examiner

SYSTEM AND METHOD FOR IDENTITY CHAINING

CROSS-REFERENCE TO RELATED APPLICATIONS

This application is a continuation of U.S. patent application Ser. No. 13/628,628 filed on Sep. 27, 2012, which claims priority to U.S. Provisional Patent Application No. 61/552,972, filed on Oct. 28, 2011, titled "IDENTITY CHAINING," by B. Scott Boding, and U.S. Provisional Patent Application No. 61/695,674, filed Aug. 31, 2012, titled "MULTIDIMENSIONAL LINKING ANALYSIS, SPIDERING FUNCTIONALITY, AND NEGATIVE LIST CHECKING ON BOUNCE," by B. Scott Boding, each of which are herein incorporated by reference in their entirety for all purposes.

BACKGROUND

Fraud detection in payment card transactions can be based on historical data. Transaction details are collected over a period of time and analyzed by various methods. Two such methods include a velocity method and an identity morphing method.

The velocity method determines a number of repeated transactions performed using a payment card over a period of time. For example, if one hundred different online transactions are charged on a payment card within a one hour time frame, the velocity method determines that fraud is likely present, because a normal consumer does not conduct one hundred transactions within an hour.

Another fraud detection method is identity morphing. Identity morphing performs historical analysis of number of identities linked to transactions. The identities can include an account number, an email, an Internet protocol (I.P.) address, a device identification (ID), a billing address, a shipping address, and/or a phone number. Each identity is reviewed in a grid, in order to determine how many variations occur for that particular identity. For example, a single phone number may be linked to a particular billing address. However, if that phone number is utilized in twenty transactions, each having a different billing address, the transactions may be flagged as fraudulent. In identity morphing, the more variations that are detected for a particular identity, the more likely that fraud is present.

Although each of the aforementioned methods can detect fraudulent transactions, each method relies on past transaction data to detect fraud.

Embodiments of the invention address these and other problems.

BRIEF SUMMARY

Embodiments of the present invention provide an identity chaining fraud detection method, which allows each current transaction to be linked to other transactions through commonly shared identities to form chains of linked transactions. If a number of linked transactions over a period of time, e.g., a chain, reaches a maximum limit indicating too many variations for a single set of identities, fraud can be detected. Additionally, if a specific identity is detected as being fraudulent, that identity can be added to a particular merchant's "negative list." Although each merchant is typically prevented from knowing the actual contents of another merchant's negative list, the payment processing entity can use the information in each merchant's negative list to detect fraud in chains of linked transactions which span across multiple different merchants. Although negative lists are discussed herein in detail, embodiments of the invention can utilize any sort of filter list, such as negative lists and positive lists.

In one embodiment of the present invention, a method is provided for identifying fraudulent transactions. The method includes selecting one or more identities associated with a first transaction, analyzing a plurality of subsequent transactions based on the one or more selected identities, linking a subsequent transaction to the first transaction if the subsequent transaction shares at least one of the one or more selected identities, forming a chain of linked transactions, identifying a fraudulent transaction based on a plurality of identities associated within each of the transactions in the chain. The first transaction is a transaction occurring at a time prior to any one of the plurality of subsequent transactions.

In accordance with an embodiment, the plurality of transactions can be visualized, showing how the plurality of transactions are linked together through one or more shared identities. This visualization, which resembles a web and may be referred to as spidering, can then be used by a reviewer to identify unusual and/or potentially fraudulent patterns of activity.

This and other embodiments of the present invention are described in further detail below.

DETAILED DESCRIPTION

Figure 1:
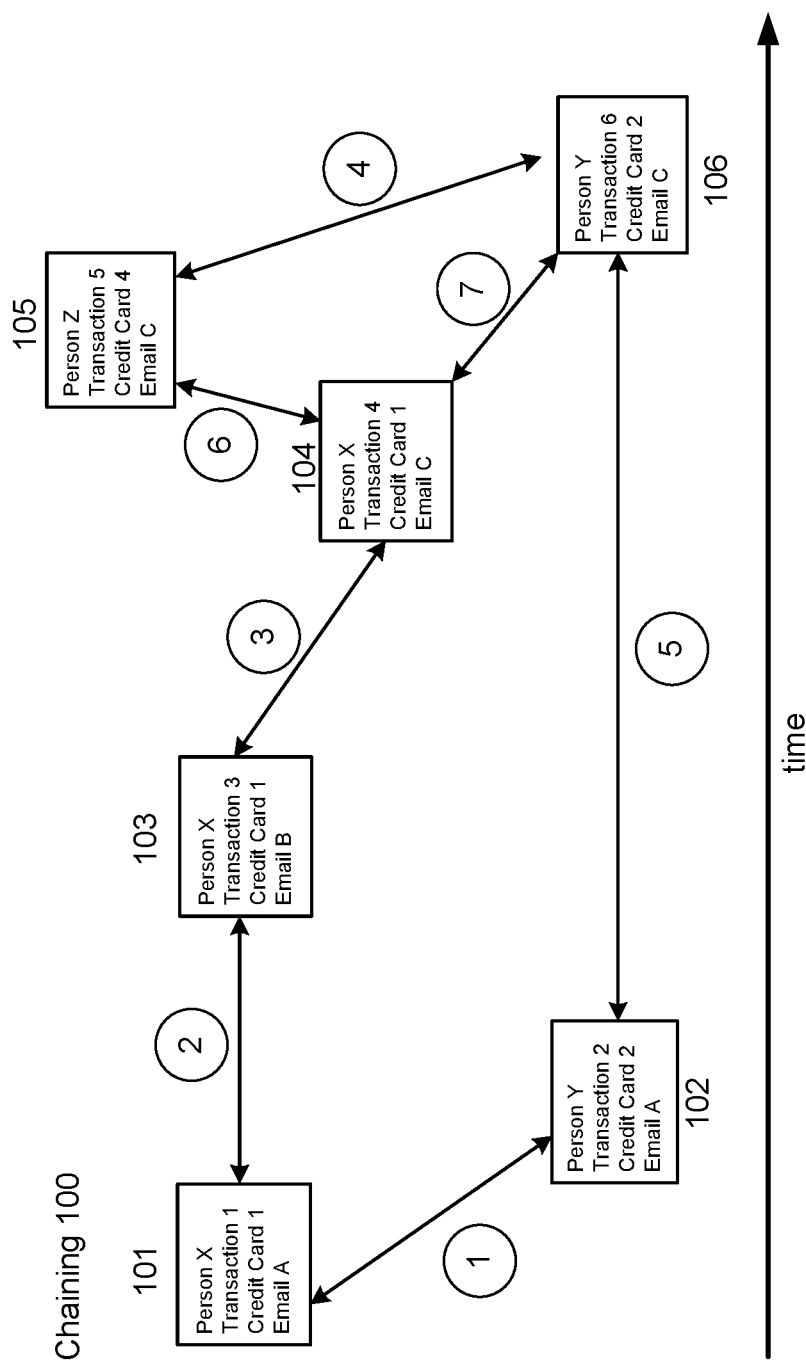
FIG. 1 shows a diagram of an identity chaining method in accordance with an embodiment of the invention.

In embodiments of the invention, identity chaining can be used in conjunction with a negative list in order to identify transactions as being potentially fraudulent. More specifically, in an identity chaining process, transactions associated with specific identities can be linked together to form a web of transactions. This process can be performed when screening orders for goods purchased on the Internet or for purchases made in person at a merchant's physical location.

Before discussing specific embodiments and examples, some descriptions of terms used herein are provided below.

As used herein, an "identity" can be a specific detail of a transaction, such as a username, a billing and/or shipping address, a payment card account number, a phone number, a device identifier or fingerprint, an email address, or any other information that can be associated with a transaction.

As used herein, a "chain" or "identity chain" can refer to a plurality of transactions which have been identified as sharing one or more identities and have been linked together based on the shared identities.

As used herein, a "mobile device" may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). Each device can be associated with a device identifier or fingerprint. For example, a mobile phone's MSISDN.

As used herein, a "transaction" may refer to any purchases, orders, invoices, payments involving goods, items, services, and/or the like. A transaction may be associated with "transaction data/information" which may include, but is not limited to, a purchase amount, a merchant identifier, description code (e.g., NAICS: North American Industry Classification System) associated with purchased items, cost of purchased items, and transactions as well as descriptions of purchased items, purchase dates, purchase amounts, indications of payments accounts used, indications of whether purchases were made online, confirmation numbers, order numbers, cancellation numbers, shipment status updates (e.g., order being processed, shipped, delivered, on back order, etc.), delivery tracking numbers, cancellation notices, updates, and/or the like.

As used herein, an "online purchase" or "online transaction" can be the purchase of a digital or physical item or service via a network, such as the Internet.

As used herein, a "payment account" (which may be associated with one or more payment devices) may refer to any suitable payment account including a credit card account, a checking account, or a prepaid account.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps when used in a claim. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim. This is consistent with the use of the term throughout the specification.

As transactions are conducted, the transactions are linked based on one or more shared identities. As the number of transactions increases, the corresponding web of transactions grows. The growth can continue to occur until an upper limit is reached, or until the available transactions have been linked. The upper limit can be used to detect likely fraudulent activity. For example, the presence of too many transactions (e.g., over 500 transactions) may indicate significant fraudulent activity. Additionally, as the number of dimensions utilized in the identity chaining process increases (i.e., as the number of identities used to link transactions increases), the number of linkable transactions similarly grows; the upper limit can prevent the system from being overwhelmed due to the increase in linkable transactions.

When analyzing transactions from multiple merchants, the identities associated with those different transactions can change or vary slightly (e.g., due to a misspelling of a street name in an address). If this occurs, then a verification service or verification process can be used to confirm that two identities that seem slightly different are actually the same. For example, an address verification service (AVS) supported by an issuer of the card can be used to determine if two slightly different addresses are actually the same address. This verification process can be used when linking different transactions together according to specific identities. Similarly, if identities associated with different transactions vary by a few characters, the system can identify these identities as one shared identity, making the analysis more robust by reducing the impact of minor typographical errors.

As noted above, the web formed by the chaining process can be used with a negative list to help identify fraudulent transactions. A negative list can be a listing maintained by the payment processing network (or a server computer associated with the payment processing network) which include identifiers, such as credit card account numbers, that have known fraudulent use. In some embodiments, the negative list can include any identity utilized to analyze a transaction. For example, the negative list identities can include, a person's name, a billing address, an email address, a shipping address, a phone number, a device identification number (MSISDN), an internet protocol (IP) address, or any other similar type of identifier. The payment processing network can maintain a plurality of negative lists each associated with, and populated with identity information by, a different merchant. Although fraud prevention is a common use of negative lists (e.g., by including identity information associated with known fraudulent activity), negative lists can include identity information corresponding to any entity with whom a merchant does not want to conduct business. Information can be added by the merchant to their negative list permanently or temporarily (e.g., an identity can be added to the merchant's negative list such that it will automatically be removed after a predetermined period of time).

FIG. 1 shows a diagram of an identity chaining method in accordance with an embodiment of the invention. The identity chaining method shown in FIG. 1 can be used in a card not present environment where multiple online merchants submit transactions to a central entity such as a payment processing network. However, embodiments of the invention could also apply to card present types of transactions (e.g., typical brick and mortar types of transactions).

As shown in FIG. 1, a plurality of transactions can be conducted and each transaction can be linked to other transactions based on their shared identities. In this example, the identities used in the identity chaining analysis 100 include name, payment card number, and email address. A first transaction 101 can be conducted, associated with the identities Person X, Credit Card 1, and E-mail A. Subsequently, a second transaction 102 is conducted, associated with the identities Person Y, Credit Card 2, and E-mail A. Person X and Person Y may both be authorized users, even though different payment card accounts and names are used to conduct the transactions. For example, the first and second transactions 101, 102 can be conducted by spouses living in the same household, which use the same e-mail address, but use different credit cards to make purchases on the Internet. A link 1 is formed between transactions 101 and 102, because the transactions share the common identity E-mail A.

A third transaction, transaction 103 is then conducted. It may have the following identities associated with it: Person X, Credit Card 1, and E-mail B. This may also be an authorized transaction, because Person X may be using Credit Card 1, but may be using a different e-mail address (e.g., a work e-mail address) to make purchases on the Internet. Transaction 103 may be linked to Transaction 101 via link 2, because of the common identities Person X and Credit Card 1.

A fourth transaction, transaction 104 is then conducted. It may have the identities: Person X, Credit Card 1, and E-mail C. The fourth transaction 104 can be linked to transaction 103 via link 3, because of the common identities Credit Card 1 and Person X.

A fifth transaction 105 may be conducted with the identities Person Z, Credit Card 4, and E-mail C. Subsequently, a sixth transaction 106 may be conducted with the identities Person Y, Credit Card 2, and E-mail C. Transaction 105 is linked to transaction 106 via link 4, because of the common identity E-mail C. Additionally, transaction 106 is linked to transaction 102 via link 5, because of the common identities Credit Card 2 and Person Y. Transaction 104 is linked to both transaction 105 by link 6 and transaction 106 by link 7 because of the common identity E-mail C.

As described above, a payment processing network (or payment processing entity) may maintain negative lists for merchants. Each negative list can include one or more identities selected by the merchant which are associated with transactions that the merchant wants to refuse. In accordance with an embodiment, each transaction shown in FIG. 1 can be with the same merchant, and negative list 108 can be that merchant's negative list as maintained by the payment processing network. As shown in FIG. 1, negative list 108 includes Credit Card 4 107, thereby indicating that this payment card account is associated with fraud. This identifier may have been previously identified because this credit card was associated with many chargebacks or the card may have been reported as being lost or stolen by the authorized cardholder. The identification of Credit Card 4 as being fraudulent can occur before any chaining takes place or during the chaining process for multiple transactions.

The negative list can be applied to the web of linked transactions shown in FIG. 1, as it is shown, or at a particular point in time during the formation of the web. For example, by applying the negative list, transaction 105 can be identified as fraudulent because it is associated with the identity Credit Card 4. Once transaction 105 has been identified as fraudulent, based on one or more identities associated with the transaction, any other identities associated with that transaction can be identified as suspicious due to their association with a fraudulent transaction. The web of linked transactions can then be traversed from the fraudulent transaction to identify potentially fraudulent transactions based on the identities associated with the fraudulent transaction. For instance, transaction 106, received after transaction 105, may be considered potentially fraudulent and may be subject to further fraud screening, because it shares an identity with transaction 105 (i.e., E-mail C). As the web of linked transactions is traversed, other transactions which share an identity with the fraudulent transaction (such as transaction 104 which also shares the identity E-mail C) can also be identified and be subject to further fraud screening.

In accordance with an embodiment, the negative list can be applied to the web of transactions retrospectively, in that it is applied after the transactions have been conducted and linked. This can be useful, because although a transaction has been conducted, the goods associated with that transaction may not have been delivered. Any fraud can be identified before good are shipped to a fraudulent party.

In accordance with another embodiment, once particular identities have been characterized as being suspect (e.g., the identities associated with transaction 105) for a particular transaction after application of a negative list, those identities can be used to identify fraudulent transactions conducted in the future. For instance, once transaction 105 is flagged as being fraudulent and the identity E-mail C is identified as being suspect, the later transaction 106 can be screened for fraud when the transaction is conducted. In this way, the application of the chaining and negative list process can be used in a prospective manner.

In accordance with an embodiment, identity chaining analysis can be performed by a payment processing network on transactions across a plurality of different merchants. For example, the fifth transaction 105 shown in FIG. 1 may be conducted at a different merchant than the merchant(s) that conducted previous transactions 1 to 4. Typically, one merchant will not be aware of another merchant's negative list. However, the data for the transactions 1 to 5 may be collected by a server computer in the payment processing network so that this chaining process can be performed, despite the fact that different merchants are conducting the transactions.

Therefore, for a current transaction at a first merchant, the payment processing network can construct a web of linked transactions, based on one or more shared identities, across different merchants and notify the first merchant of related fraudulent or suspicious transactions. For example, the first merchant can be notified of a related transaction at a second merchant which has an identity on the first merchant's negative list. Additionally, or alternatively, the first merchant can be notified of related transactions which include identities that other merchants have identified as fraudulent or suspicious (i.e., identities which other merchants have added to their negative lists). Depending on information sharing requirements, for example legal or contractual reporting limitations, the type or specificity of information which can be shared about transactions at other merchants may be limited. For example, specific details of the transaction, such as the other merchant or the identity may or may not be shared. Instead the first merchant could be informed that the current transaction is related to a transaction which is associated with fraud. Alternatively, the first merchant could be notified of the absence of fraudulent or suspicious activity related to the current transaction (i.e., that the current transaction is not related to a known fraudulent or suspicious transaction).

Figure 2:
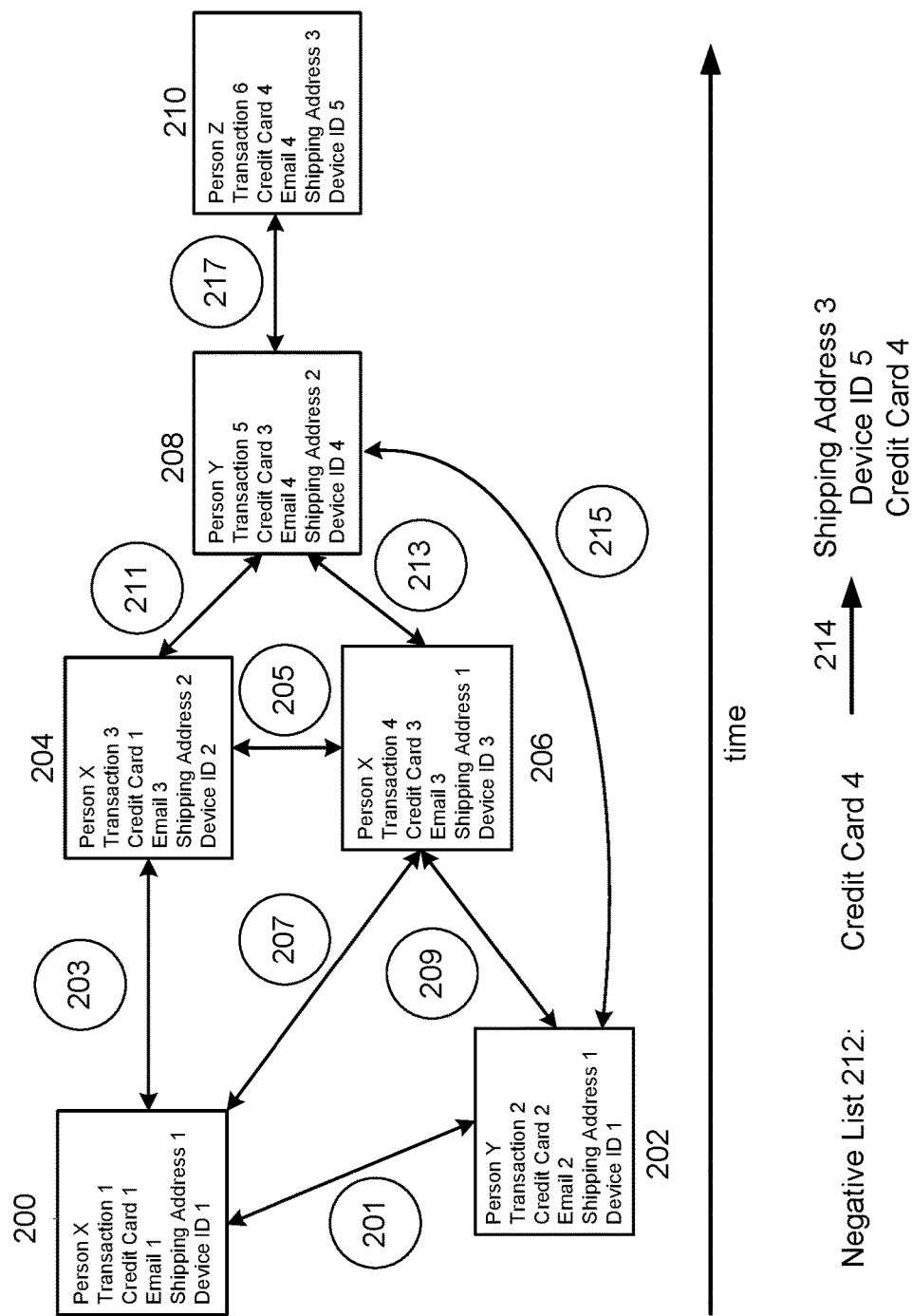
FIG. 2 shows a diagram of a multidimensional identity chaining method in accordance with an embodiment of the invention.

FIG. 2 shows a multidimensional identity chaining process, in accordance with an embodiment. In the example shown in FIG. 2, a plurality of identities are used to link related transactions. Here, multidimensional refers to the use of more identities than just name, payment account, and email. For example, in FIG. 2, name, payment account, email address, shipping address and device identifier are used for linking, however more or fewer identities could also be used.

As shown in FIG. 2, a first transaction 200 can be conducted, associated with the identities Person X, Credit Card 1, E-mail 1, Device Identifier 1, and Shipping Address 1. Subsequently, a second transaction 202 is conducted. Transaction 2 may also be associated with a plurality of identities, including: Person Y, Credit Card 2, E-mail 2, Shipping Address 1, and Device Identifier 1. Person X and Person Y may be authorized users, even though different credit cards and names are used to conduct the transactions. For example, the first and second transactions 200, 202 can be conducted by members of the same household using the same computer, but which each use different credit cards and email addresses to make purchases on the Internet. By utilizing the shipping address and device identifier identities, transactions from different members of the same household can be linked, where other identities may not have indicated a relationship. A link 201 is formed between transactions 200 and 202, because the transactions share the common identities Shipping Address 1 and Device Identifier 1.

A third transaction, transaction 204 is then conducted. Transaction 204 may be associated with Person X, Credit Card 1, E-mail 3, Shipping Address 2 and Device Identifier 2. This may also be an authorized transaction by Person X using Credit Card 1, but Person X may be conducting the transaction from work, using a work E-mail address (e.g., E-mail address 3), work Shipping Address (e.g., Shipping Address 2), and work computer (e.g., Device Identifier 2) to make purchases on the Internet. Device identifier 2 could also indicate the use of a second device, such as a mobile device, to conduct the transaction. Transaction 204 may be linked to Transaction 200 via link 203, because of the common identities Person X and Credit Card 1.

A fourth transaction, transaction 206 is then conducted. Transaction 206 may be associated with Person X, Credit Card 3, Email 3, Shipping Address 1 and Device ID 3. For example, this may be an authorized transaction conducted by Person X using a different Credit Card (e.g., Credit Card 3) from a different computer or device (e.g., Device Identifier 3). The fourth transaction 206 can be linked to transaction 204 via link 205, because of the common identities Email 3 and Person X. The fourth transaction 206 can also be linked to transaction 200 via link 207 based on the shared identifiers Person X and Shipping Address 1; and linked to transaction 202 via link 209 based on the shared identifier Shipping Address 1.

Subsequently, a fifth transaction 208 may be conducted with the identities Person Y, Credit Card 3, Email 4, Shipping Address 2 and Device Identifier 4. This transaction can be linked to transaction 204 via link 211 based on the shared identity Shipping Address 2, and linked to transaction 206 via link 213 based on the shared identity Credit Card 3. Transaction 208 can also be linked to transaction 202 via link 215 based on the shared identity Person Y.

Thereafter, transaction 210 may be conducted, associated with Person Z, Credit Card 4, Email 4, Shipping Address 3 and Device Identifier 5. Transaction 210 is linked to transaction 208 via link 217, because of the common identity Email 4. Transaction 210 may be conducted at a different merchant than the merchant(s) that conducted previous transactions 1 to 5. However, the data for the transactions may be collected by a server computer in a payment processing network so that this chaining process can be performed, despite the fact that different merchants are conducting the transactions.

The negative list can be applied to the web shown in FIG. 2, as it is shown, or dynamically as transactions are conducted and linked. For example, by applying the negative list, transaction 210 can be identified as fraudulent because it is associated with the identity Credit Card 4 on the negative list 212. Furthermore, the negative list 212 can be updated 214 to include other identities from fraudulent transaction 210, such as Device ID 5 and Shipping Address 3. The chain of linked transactions can then be compared against the updated negative list. Other transactions which share identities with fraudulent activities may be identified as being potentially fraudulent transactions. For instance, transaction 208 may be considered potentially fraudulent and may be subject to further fraud screening, since transaction 208 shares the identity Email 4 with transaction 210. Similarly, other transactions linked to a potentially fraudulent transaction, such as transaction 208, may also be subject to further fraud scrutiny. For example, transactions 202, 204 and 206, which are linked to transaction 5, may be subjected to further fraud screening. In accordance with an embodiment, the fraud screening procedures used can vary depending on how far removed a particular suspect transaction is from a known fraudulent transaction. For example, because transaction 208 is directly linked to fraudulent transaction 210, transaction 208 may be subjected to more detailed fraud screening procedures than transactions 202, 204 or 206, which are indirectly linked to transaction 210. If transaction 208 failed to pass the fraud screening, then more detailed fraud screening could then be applied to transactions 202, 204 and 206, and so on.

A fraud score can be assigned to a transaction, at least in part, based on how closely related the transaction is to a known fraudulent transaction. A fraud score can be a number representing how risky a particular transaction is. For example, a known fraudulent transaction may be assigned a highest fraud score, e.g., 99, while a known authorized transaction may be assigned a lowest fraud score, e.g., 0. A transaction closely linked to a known fraudulent transaction, such as transaction 208's fraud score may be adjusted higher because it is directly linked to transaction 210, a known fraudulent transaction. Less directly related transactions, such as transactions 202, 204 and 206 may also have their fraud scores increased, though to a lesser degree than transaction 208.

Additionally, as described above with respect to FIG. 1, the identity chaining analysis can be used dynamically, as transactions are received. For instance, once transaction 210 is flagged as being fraudulent and the identities Email 4, Shipping Address 3 and Device ID 5 are identified as being suspect, then as subsequent transactions are received, these transactions can be screened for fraud. In this way, the application of the chaining and negative list process can be used in a prospective manner.

In accordance with an embodiment, one fraud screening technique can utilize spidering functionality, based on multidimensional identity chaining. When an identity chaining process is executed, the transactions and associated links can be stored at one or more servers in a payment processing network. The identity chaining information can be utilized as described above to prospectively or retrospectively identify fraudulent and/or suspect transactions. Spidering functionality enables a visualization of the multidimensional identity chaining information to be generated and analyzed by a reviewer, e.g., if a transaction is identified as fraudulent or suspect. Such a visualization may resemble the examples shown in FIGS. 1 and 2. The visualization can be a static representation of transactions which have already occurred, or may be dynamically updated with new transaction and linking information as transactions occur. Further the visualization can include controls which enable the visualization to be traversed by the reviewer and to identify areas of the visualization most closely linked to known fraudulent transactions. Each transaction shown in the visualization can include a hyperlink which, when selected by a reviewer, can show the reviewer additional transaction data and/or present additional screening options to the reviewer. The visualization may also be represented as a heat map, which colors different clusters of transactions in a particular identity chain depending on the transactions' fraud scores or other characteristic.

Additionally, custom chains can be generated and viewed for a given transaction. For example, a reviewer can select a subset of identities associated with a current transaction to be used to identify and link related transactions in a chain. Types of additional fraud screening can be selected for each transaction represented in the visualization by the reviewer and indicated in the visualization. Additionally, a default fraud screening procedure can automatically be selected for transactions based on how closely linked the transaction is to a known fraudulent transaction. The default screening procedure can be adjusted by the reviewer within the visualization. Furthermore, historical transaction chains for a particular household can also be visualized and compared to the visual representation of current transaction chains by reviewers, enabling reviewers to visually identify transactions which appear to be atypical for a particular household or individual, based on previous patterns of transactions.

Figure 3:
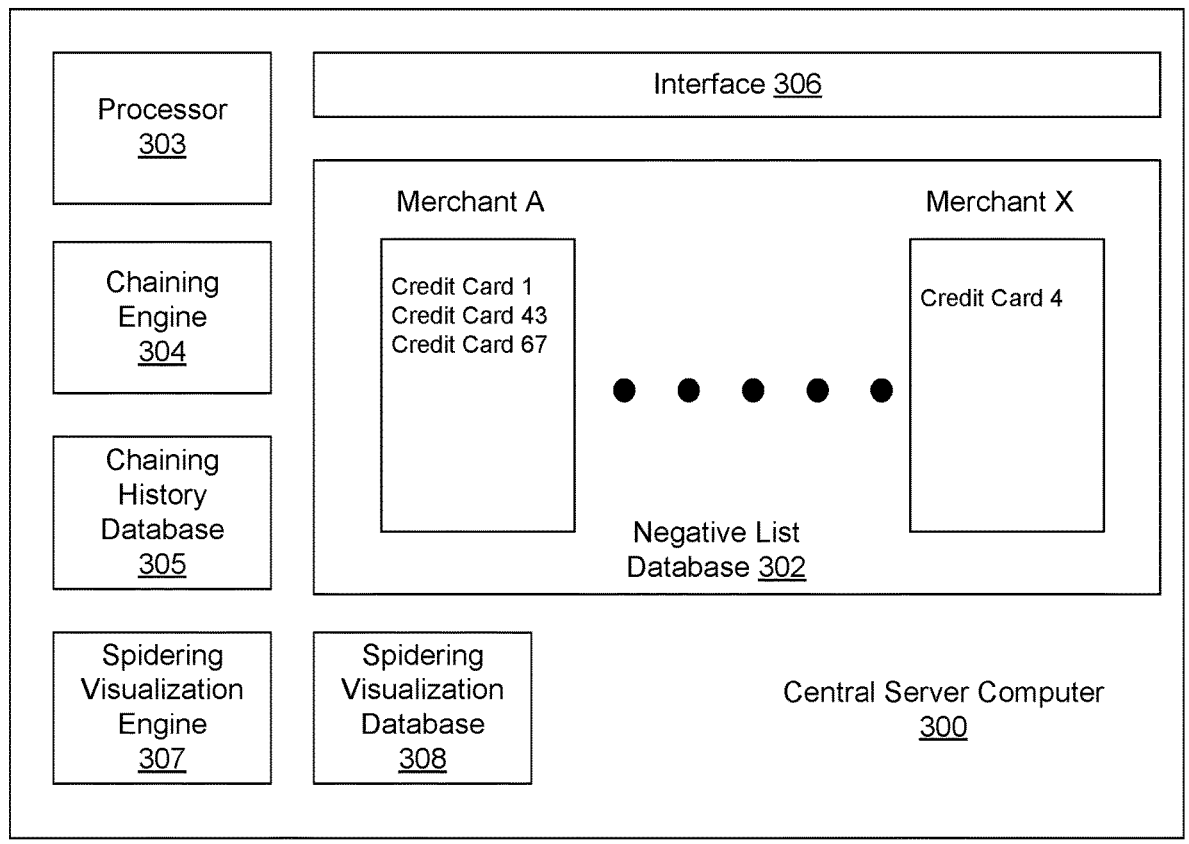
FIG. 3 shows a diagram of a central server computer for implementing an identity chaining method, in accordance with an embodiment of the invention.

Referring now to FIG. 3, a central server computer 300, such as in a payment processing network, capable of implementing the identity chaining and maintaining negative lists is illustrated. The central server computer 300, can include an interface 306 for communicating with the network, a processor 303 for executing code to perform the functions of the server computer 300, a chaining engine 304 for analyzing transactions and generating chains, and a chaining history database 305. The chaining history database 305 can be utilized as a reference for current transactions and chains to detect fraud. The central server computer 300 can additionally be coupled to a negative list database 302 for each merchant, e.g., "Merchant A" and "Merchant X" associated with the payment processing network. Although a single database is shown in FIG. 3, a plurality of databases can be utilized to maintain the merchants' negative lists. The central server computer can also include a spidering visualization engine 307, which can access transaction information in the chaining history database and generate a visualization of linked transactions. Once generated, these visualizations can be stored in spidering visualization database 308 for later analysis or review.

As described above, payment processing networks can maintain a database 302 of negative lists for each merchant that are merchant specific so as to not share one merchant's transaction information with other merchants. In some cases, individual merchants also maintain their own negative list and can communicate the information (e.g., an information code) to the payment processing network. However, each individual merchant list may be regulated by law to be only viewable by that merchant. As such merchant information and other transactional information are secured by the merchant and processing network. In some embodiments, the utilization of a chain that provides identities to a centralized negative list, which is not based on the merchant related transaction information, can allow a more concise analysis of current transactions. In other embodiments, transaction information which is on a negative list of a merchant is not communicated to the payment processing network, but a related information code indicating a reason for the identity being on the negative list is provided by a merchant or by the payment processing network to another merchant. In such an embodiment, for example, a code stemming from a transaction linked to a negative list by merchant A, can be communicated to merchant B when a transaction having linked transaction information is being performed by merchant B (e.g., the billing address on the negative list transaction at merchant A is utilized in a transaction with merchant B). The code may not indicate the exact address recorded on merchant A's negative list, but a code indicating "fraud alert: billing information" may be indicated. In some instances, the merchant may wish to ignore a fraud alert provided that stems from another merchant. This is because merchants may add any individual to a negative list for any number of reasons, such as too many chargebacks, or even for personal reasons. Accordingly, though these factors may cause that individual to be placed on one merchant's negative list, they may not be reason enough for another merchant to place that user on their negative list.

Once an individual is placed on a negative list, the identity chaining system can remove that individual from the list after a predetermined time period, e.g., six months, assuming that identities linked to that individual have not been indicated in any other fraudulent transaction attempts. This aids in removing individuals erroneously placed on a negative list. For example, if an individual changes an email associated with a card too many times, or associates several different emails with several different cards, each having a similar billing address, false negatives can be produced. Accordingly, in addition to automatic removal, if a particular identity is found not to be fraudulent, the merchant has the option to manually go into a negative list and remove that identity from their negative list. If a merchant removes a transaction from the negative list, the links in the chain for that transaction can be broken.

In some embodiments, the identity chaining system may only check a negative list directly based on specific elements of a current transaction. In other embodiments, the identity chaining system can pull back transactions based on history chaining (e.g., over a 6 month time frame) and can simultaneously analyze those transactions in relation to a negative list. The aforementioned embodiment is useful when another merchant conducts a transaction, the elements of that new transaction are checked even if only certain separate (e.g., individual identities) elements are negative listed throughout the network.

Figure 4:
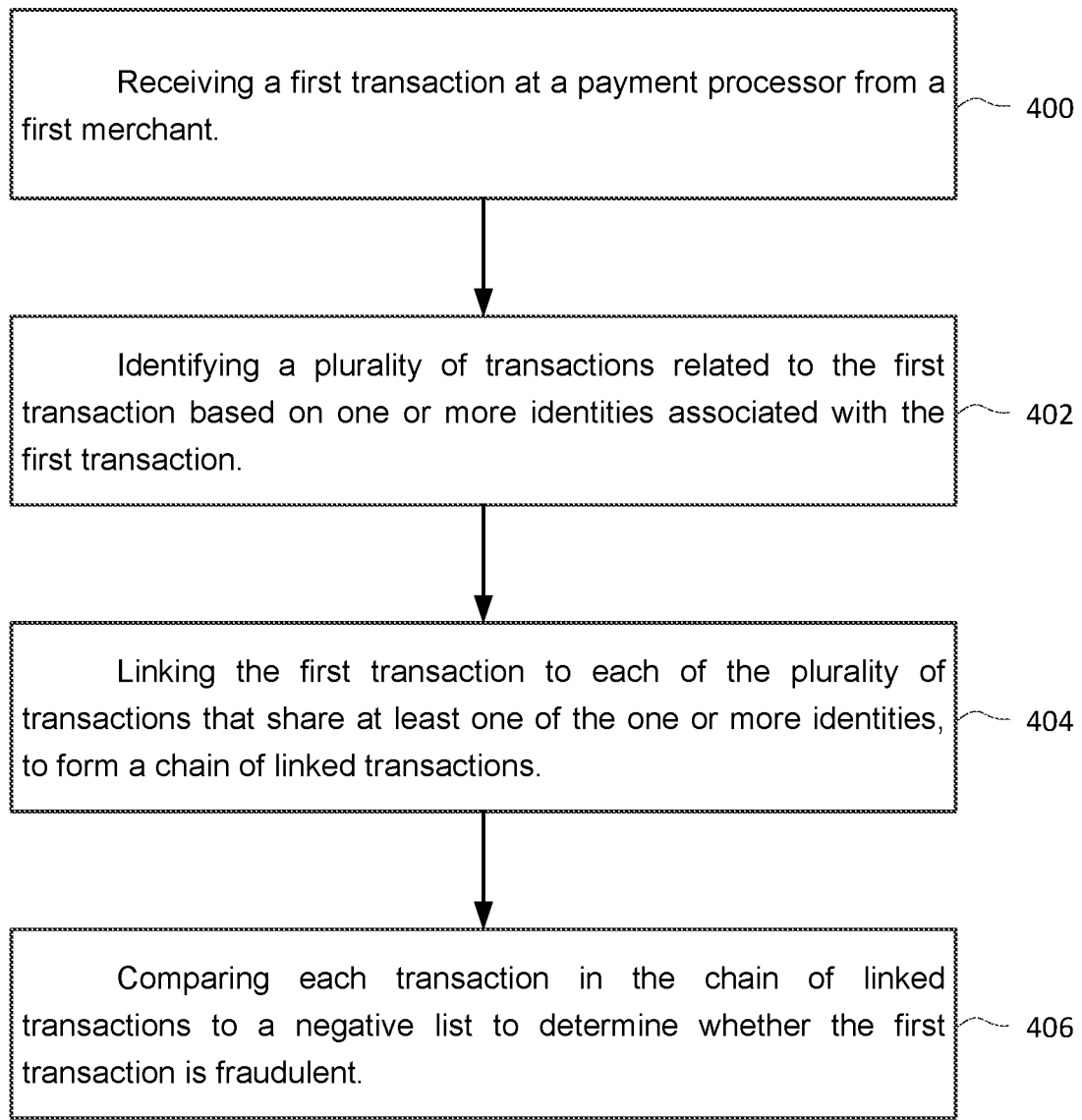
FIG. 4 shows a method of identity chaining, in accordance with an embodiment.

FIG. 4 shows a method of identity chaining, in accordance with an embodiment. At step 400, a first transaction (e.g., the most recent transaction), is received at a payment processor from a first merchant. At step 402, a plurality of transactions related to the first transaction are identified based on one or more identities associated with the first transaction. That is, for the first transaction a predefined number of historical transactions can be retrieved based on history chaining. For example, fifty transactions which share one or more identities with the current transaction can be retrieved. For example, these linked transactions can be identified using the chaining history database described above with respect to FIG. 3. At step 404, the first transaction is linked to each of the plurality of transactions that share at least one of the one or more identities, to form a chain of linked transactions. Once the first transaction is linked to the historical transactions, it can be analyzed based on its relationships to the historical transactions. At step 406, each transaction in the chain of linked transactions is compared to a negative list to determine whether the first transaction is fraudulent. This comparison can include, e.g., comparing the identities of each of the related historical transactions with the first merchant's negative list to determine whether any of the related transactions are associated with fraudulent or suspect activity. An identity associated with an historical transaction which was previously not associated with fraudulent activity, may have subsequently been added to the merchant's negative list based on later fraudulent activity. By reanalyzing linked historical transactions which are linked to the current transaction using the merchant's current negative list, current information regarding known fraudulent activities can be used to analyze related transactions and to determine the risk of the current transaction. In accordance with an embodiment, once linked chains of transactions have been created, new transactions can be dynamically linked and added to the chains as they are received. This allows for new transactions to be analyzed in real-time with past and concurrent transactions with which one or more identities are shared.

After dynamically analyzing a transaction being conducted at a merchant location, the merchant can be provided with an indication of whether the transaction is fraudulent. In some embodiments, the indication may be an alert message simply stating that fraud has been detected. In further embodiments, the indication may be quantitative, such as a score or percentage. In other embodiments, as previously discussed, the indication may be accompanied by a code which provides reason for the possible fraud. With each indication of fraud, the identity chaining system also raises that merchant's fraud score, which can be provided to the merchant each time that a fraudulent transaction is indicated. Additionally, the penalty associated with a fraud score can increase and be communicated to the merchant. The merchant can also receive such communications after a threshold amount have occurred or predetermined time has passed. For example, the merchant could receive a communication including their current fraud score, the current penalty imposed and a listing of the fraudulent transactions. Furthermore, the indication of whether the transaction is fraudulent could alternatively indicate the absence of fraud, e.g., by indicating that a given transaction is not linked to any known fraudulent activity. The type and scope of information indicated can vary depending on whether the linked fraudulent or suspicious transactions were conducted with different merchants, as discussed above.

By conducting identity chaining across a transaction processing platform and analyzing the linked information for incongruities, fraudulent transactions can be identified. Furthermore, by cross referencing the linked elements within a chain (e.g., the sum of related transactions) to those placed negative lists by a plurality of merchants, a more concise fraud detection system can be implemented.

Figure 5:
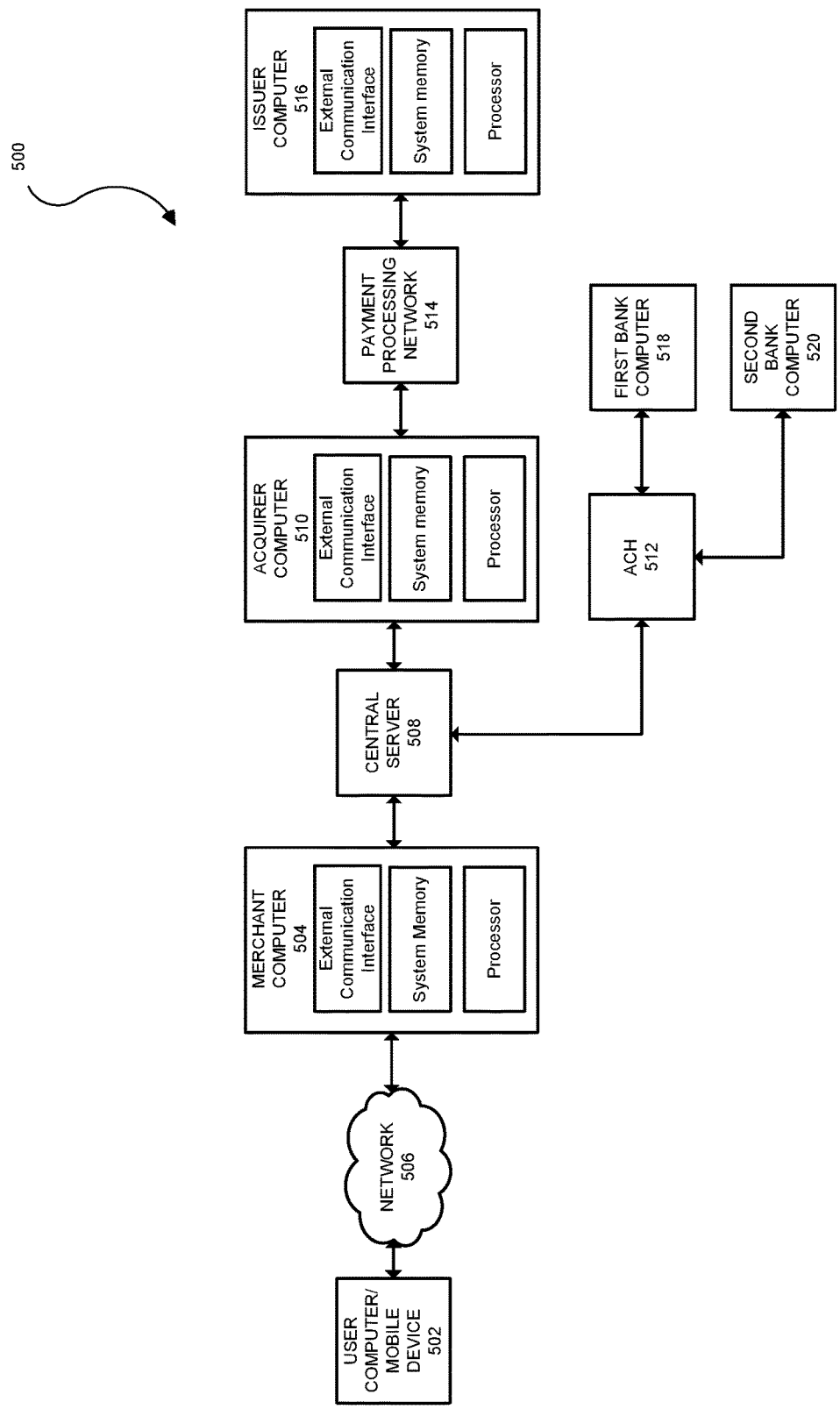
FIG. 5 shows a system for implementing an identity chaining method, in accordance with an embodiment.

FIG. 5 shows a system for implementing an identity chaining method, in accordance with an embodiment. As shown in system 500, a user can conduct a transaction with a merchant using user computer/mobile device 502. The user computer/mobile device 502 can connect to a merchant computer 504 via a network 506, such as the internet. To complete the transaction, the merchant computer 504 can send transaction details to central server computer 508. In accordance with an embodiment, central server computer 508 can be the central server computer shown in FIG. 3, above. The central server computer can perform fraud checks, including the identity chaining method described above, on the transaction in real time, or it can perform the fraud checks after processing the transaction.

Depending on a payment method associated with the transaction, the central server computer 508 can pass the transaction data to its acquirer computer 510 or directly to an automated clearing house (ACH) 512. For checking account payments, the transaction details can be sent to ACH 512 which can communicate with a first bank computer 518 at a first bank and a second bank computer 520 at a second bank to complete the transaction and transfer appropriate funds from a user bank account to a merchant bank account. For payment card accounts, such as debit, credit and prepaid accounts, the transaction details can be passed to acquirer computer 510. A payment processing network 514 may be disposed between the acquirer computer 510 and an issuer computer 516. Furthermore, the merchant computer 504, the acquirer computer 510, the payment processing network 514, and the issuer computer 516 may all be in operative communication with each other (i.e. one or more communication channels may exist between each of the entities, whether or not these channels are used in conducting a financial transaction).

The payment processing network 514 may include data processing subsystems, networks, and operations used to support and deliver authorization services, exception file services, and clearing and settlement services. For example, the payment processing network 514 may comprise a server computer, coupled to a network interface (e.g. by an external communication interface), and a database(s) of information. An exemplary payment processing network may include VisaNet™ Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network 514 may use any suitable wired or wireless network, including the Internet. In accordance with an embodiment, the central server computer 508 can be in payment processing network 514.

Although many of the data processing functions and features of some embodiments may be present in the payment processing network 514 (and a server computer therein), it should be understood that such functions and features could be present in other components such as the issuer computer 516, and need not be present in the payment processing network 514, or a server computer therein.

Figure 6:
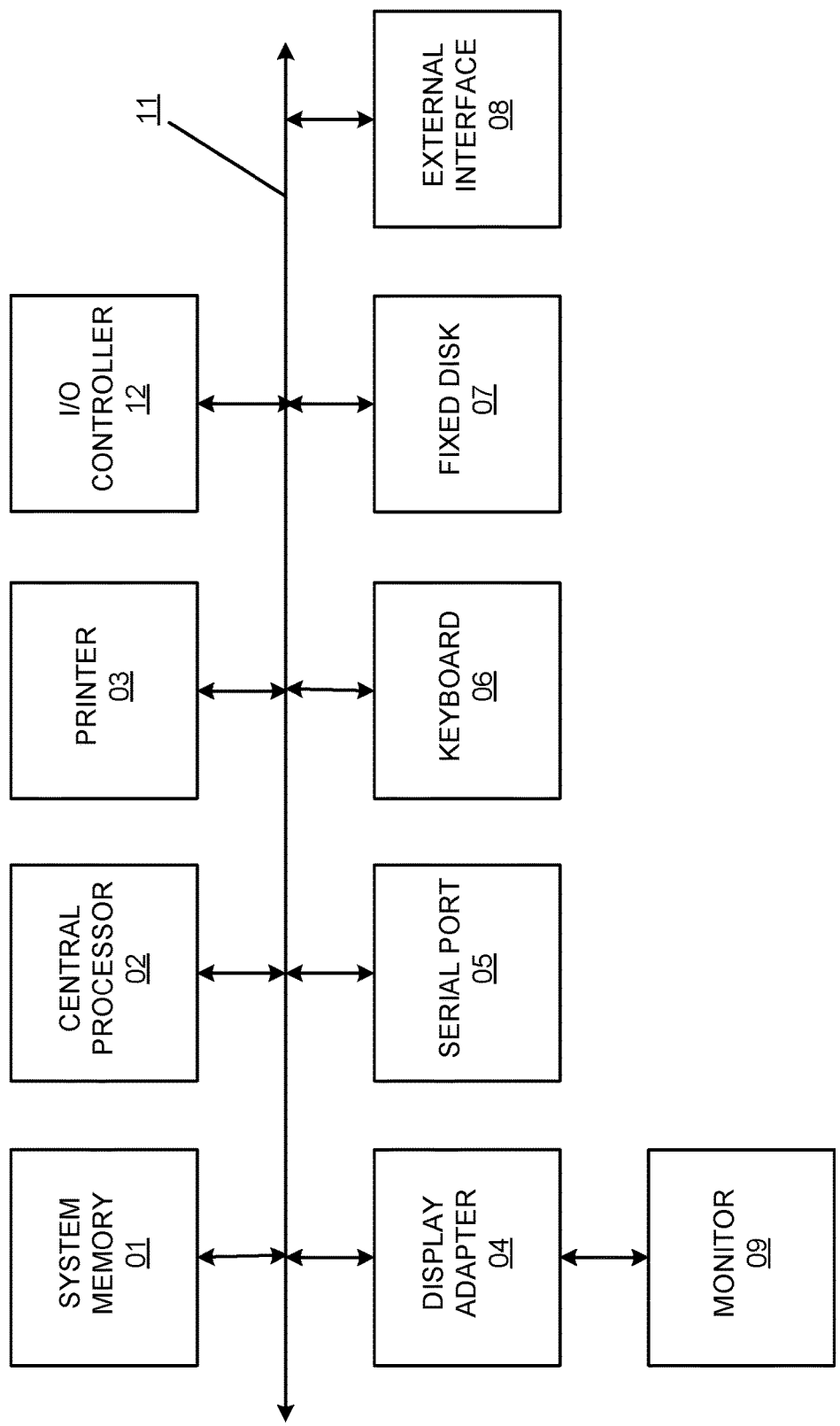
FIG. 6 illustrates exemplary elements of a computer apparatus.

FIG. 6 illustrates exemplary elements of a computer apparatus. As noted above, the various participants and elements shown in FIGS. 1-4 can operate one or more computer apparatuses to facilitate the functions described herein. As would be appreciated by one of skill in the art after reading this disclosure, any of the elements in FIGS. 1-5 can use any suitable number of systems and subsystems to facilitate the functions described herein. Moreover, each of the systems and subsystems may comprise any number of hardware and software modules, such as those described above.

Examples of such systems, subsystems, and components are shown in FIG. 6. The subsystems and components shown in FIG. 6 are interconnected via a system bus 11. Additional subsystems such as a printer 03, keyboard 06, fixed disk 07 (or other memory comprising computer readable media), monitor 09, which is coupled to display adapter 04, and others are shown. Peripherals and input/output (I/O) devices, which coupled to I/O controller 12, can be connected to the computer system by any number of means known in the art, such as serial port 05. For example, serial port 05 or external interface 08 can be used to connect the computer apparatus to a wide area network such as the Internet, a mouse input device, or a scanner. The interconnection via system bus allows the central processor 02 to communicate with each subsystem and to control the execution of instructions from system memory 01 or the fixed disk 07, as well as the exchange of information between subsystems. The system memory 01 and/or the fixed disk 07 can embody a computer readable medium.

It is understood that the various embodiments described herein are by way of example only, and are not intended to limit the scope of the invention. For example, many of the materials and structures described herein may be substituted with other materials and structures without deviating from the spirit of the invention. The present invention as claimed may therefore include variations from the particular examples and preferred embodiments described herein, as will be apparent to one of skill in the art. It is understood that various theories as to why the invention works are not intended to be limiting.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, dimensions, and materials provided herein within the specification or within the figures are by way of example only.

A recitation of "a," "an," or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. A method comprising:
    receiving, at a central server computer from a first merchant computer over a network, first transaction data of a first transaction involving network communications between a first user computer and the first merchant computer, wherein the first transaction data includes a first plurality of identities, and wherein each identity in the first plurality of identities corresponds to a different first transaction datum from the first transaction data;
    prior to receiving the first transaction data:
        receiving, at the central server computer from a second merchant computer over the network, second transaction data of a second transaction involving network communications between a second user computer and the second merchant computer, wherein the second transaction data includes a second plurality of identities, and wherein each identity in the second plurality of identities corresponds to a different second transaction datum from the second transaction data;
        processing, by a chaining engine executing on the central server computer, transaction data from a plurality of merchant computers comprising the second merchant computer, to identify a plurality of transactions including the second transaction;
        storing the plurality of transactions in a chaining history database;
        generating, in the chaining history database, links between the plurality of stored transactions based on shared identities in transaction data of the plurality of transactions; and
        generating, by the chaining engine executing on the central server computer, a dynamic chain of linked transactions configured to be updated by adding one or more additional transactions in real-time;
    after receiving the first transaction data:
        updating in real-time, by the chaining engine executing on the central server computer, the dynamic chain of linked transactions by:
            linking, in real-time the first transaction to at least one of the plurality of stored transactions previously linked to each other in the chaining history database,
            wherein in the dynamic chain of linked transactions the first transaction is linked to the second transaction through a first identity that is included in the first plurality of identities and the second plurality of identities;
        storing a plurality of negative list databases, each associated with a different one of the plurality of merchant computers and only viewable by a corresponding merchant computer;
        comparing, in real-time and by the chaining engine executing on the central server computer, each identity stored in the dynamic chain of linked transactions to a negative list database of identities associated with one or more fraudulent activities to determine whether the first transaction is fraudulent, wherein the negative list database corresponds to a third merchant computer;
        matching, by the chaining engine executing on the central server computer based on the dynamic chain of linked transactions, a second identity from the second plurality of identities associated with the second transaction to an identity from the negative list database of identities, wherein the second identity is not included in the first plurality of identities associated with the first transaction, the second transaction is linked to the first transaction in the dynamic chain of linked transactions;
        based on the matching:
            identifying, by the central server computer, the first transaction as a fraudulent transaction based on the first plurality of identities associated with the first transaction being linked to the second identity from the second plurality of identities associated with the second transaction on the dynamic chain of linked transactions after updating the dynamic chain of linked transactions in real-time;

generating, by the central server computer, a first message indicating a first fraud alert for the first transaction and a second message indicating a second fraud alert for the second transaction;

sending over the network, by the central server computer, the first message to the first merchant computer indicating the first fraud alert for the first transaction;

sending over the network, by the central server computer, the second message to the second merchant computer indicating the second fraud alert for the second transaction; and updating, by the central server computer, the negative list database of the third merchant computer based on the dynamic chain of linked transactions to include a third identity from the second plurality of identities of the second transaction, the third identity not previously included in the negative list database.

2. The method of claim 1, further comprising:
updating the negative list database of the third merchant computer to include a fourth identity from the first plurality of identities associated with the first transaction, the fourth identity not previously included in the negative list database.

3. The method of claim 1, further comprising:
applying, by the central server computer, a fraud screening procedure to the first transaction, the fraud screening procedure determined based on a number of links between the first transaction as a suspect transaction and the second transaction as a known fraudulent transaction in the dynamic chain of linked transactions.

4. The method of claim 1, wherein the first plurality of identities includes information specific to the first transaction including at least one of a username, a billing address, a shipping address, a payment card account number, a phone number, a device identifier, and an email address.

5. The method of claim 4, wherein the negative list database is populated with identities selected by the third merchant computer.

6. The method of claim 1, further comprising:
receiving, over the network, a third transaction, subsequent to the first transaction, from the first merchant computer; and
dynamically linking the third transaction to the dynamic chain of linked transactions stored in the chaining history database.

7. The method of claim 1, further comprising:
sending, over the network, a response to the first merchant computer, the response indicating whether the first transaction is fraudulent, wherein the response includes a fraud score.

8. The method of claim 7, wherein the first transaction is linked to a fraudulent transaction conducted by a different merchant that shares at least one identity with the first transaction, and the response further indicates that the first transaction is linked to the one or more fraudulent activities.

9. A system comprising:
a central server computer that includes a computer readable medium and processor, in communication with a plurality of merchant computers, wherein the central server computer is configured to:

receive, from a first merchant computer over a network, first transaction data of a first transaction involving network communications between a first user computer and the first merchant computer, wherein the first transaction data includes a first plurality of identities, and wherein each identity in the first plurality of identities corresponds to a different first transaction datum from the first transaction data; and receive, at the central server computer from a second merchant computer over the network, second transaction data of a second transaction involving network communications between a second user computer and the second merchant computer, wherein the second transaction data includes a second plurality of identities, and wherein each identity in the second plurality of identities corresponds to a different second transaction datum from the second transaction data;

a chaining history database that stores a chain of linked transactions prior to receiving the first transaction data;

a plurality of negative list databases, each associated with one of a plurality of merchant computers and only viewable by a corresponding merchant computer;

a chaining engine, executing on the central server computer, wherein the chaining engine is configured to:

prior to receiving the first transaction data:
process transaction data from the plurality of merchant computers comprising the second merchant computer, to identify a plurality of transactions including the second transaction;
store the plurality of transactions in the chaining history database;
generate, in the chaining history database, links between the plurality of stored transactions based on shared identities in transaction data of the plurality of transactions; and
generating, by the chaining engine executing on the central server computer, a dynamic chain of linked transactions configured to be updated by adding one or more additional transactions in real-time;

after receiving the first transaction data:
updating in real-time, by the chaining engine executing on the central server computer, the dynamic chain of linked transactions by:
linking, in real-time, the first transaction to at least one of the plurality of stored transactions previously linked to each other in the chaining history database, wherein in the dynamic chain of linked transactions the first transaction is linked to the second transaction through a first identity that is included in the first plurality of identities and the second plurality of identities;
comparing, in real-time, each identity stored in the dynamic chain of linked transactions to a negative list database of identities associated with one or more fraudulent activities to determine whether the first transaction is fraudulent, wherein the negative list database corresponds to a third merchant computer;
matching, based on the dynamic chain of linked transactions, a second identity from the second plurality of identities associated with the second transaction to an identity from the negative list database of identities, wherein the second identity is not included in the first plurality of identities associated with the first transaction, the second transaction is linked to the first transaction in the dynamic chain of linked transactions, wherein the central server computer is further configured to:

identify the first transaction as a fraudulent transaction based on the first plurality of identities associated with the first transaction being linked to the second identity from the second plurality of identities associated with the second transaction on the dynamic chain of linked transactions after updating the dynamic chain of linked transactions in real-time;

generate a first message indicating a first fraud alert for the first transaction and a second message indicating a second fraud alert for the second transaction;

send, over the network, based on the matching, the first message to the first merchant computer indicating the first fraud alert for the first transaction;

send, over the network, based on the matching, the second message to the second merchant computer indicating the second fraud alert for the second transaction; and update the negative list database of the third merchant computer based on the dynamic chain of linked transactions to include a third identity from the second plurality of identities of the second transaction, the third identity not previously included in the negative list database.

10. The system of claim 9, wherein the central server computer is further configured to update the negative list database of the third merchant computer to include a fourth identity from the first plurality of identities associated with the first transaction, the fourth identity not previously included in the negative list database.

11. The system of claim 9, wherein the central server computer is further configured to apply a fraud screening procedure to the first transaction, the fraud screening procedure determined based on a number of links between the first transaction as a suspect transaction and the second transaction as a known fraudulent transaction in the dynamic chain of linked transactions.

12. The system of claim 9, wherein the first plurality of identities includes information specific to the first transaction including at least one of a username, a billing address, a shipping address, a payment card account number, a phone number, a device identifier, and an email address.

13. The system of claim 12, wherein the negative list database is populated with identities selected by the third merchant computer.

14. The system of claim 9, wherein the central server computer is further configured to:

receive, over the network, a third transaction, subsequent to the first transaction, from the first merchant computer; and dynamically link the third transaction to the plurality of transactions.

15. The system of claim 9, wherein the central server computer is further configured to:

send, over the network, a response to the first merchant computer which indicates whether the first transaction is fraudulent, wherein the response includes a fraud score.

16. The system of claim 15, wherein the first transaction is linked to a fraudulent transaction conducted by a different merchant which shares at least one identity with the first transaction, and the response further indicates that the first transaction is linked to the one or more fraudulent activities.

17. A method for identifying fraudulent transactions, the method comprising:

performing, by a chaining engine executing on a central server computer, a chaining process linking a plurality of transactions to a first transaction associated with a first plurality of identities, wherein the first transaction is associated with a plurality of first transaction data, and wherein each identity in the first plurality of identities corresponds to a different first transaction datum from the plurality of first transaction data, and wherein the chaining process includes:

processing transaction data from a plurality of merchant computers to identify the plurality of transactions that are each associated with at least one identity shared with another one of the plurality of transactions;

generating, in a chaining history database, links between the plurality of transactions based on shared identities in transaction data of the plurality of transactions;

generating, by the chaining engine executing on the central server computer, a dynamic chain of linked transactions configured to be updated by adding one or more additional transactions in real-time;

updating in real-time, by the chaining engine executing on the central server computer, the dynamic chain of linked transactions by:

linking, in real-time, the first transaction to the plurality of transactions previously linked to each other in the chaining history database, the plurality of transactions including a second transaction associated with a second plurality of identities, wherein the second transaction is associated with a plurality of second transaction data and wherein each identity in the second plurality of identities corresponds to a different second transaction datum from the plurality of second transaction data, and wherein in the dynamic chain of linked transactions the first transaction is linked to the second transaction through a first identity that is included in the first plurality of identities and the second plurality of identities, comparing, in real-time and by the chaining engine executing on the central server computer, each transaction in the dynamic chain of linked transactions to a plurality of negative list databases of identities associated with fraudulent activity to determine whether the first transaction is fraudulent, wherein each of the plurality of negative list databases corresponds to a different merchant computer, and matching, by the chaining engine executing on the central server computer based on the dynamic chain of linked transactions, a second identity from the second plurality of identities associated with the second transaction to an identity from the plurality of negative list databases of identities associated with fraudulent activity, wherein the second identity is not included in the first plurality of identities associated with the first transaction, the second transaction is linked to the first transaction in the dynamic chain of linked transaction;

identifying, by the central server computer, the first transaction as a fraudulent transaction based on the first plurality of identities associated with the first transaction being linked to the second identity from the second plurality of identities associated with the second transaction on the dynamic chain of linked transactions after updating the dynamic chain of linked transactions in real-time;

generating, by a visualization engine executing on the central server computer, a visualization data structure of the dynamic chain of linked transactions, wherein the visualization data structure shows the plurality of transactions at locations on an axis that indicate relative times of the plurality of transactions over a period of time and depicts links between the plurality of transactions based on the chaining process; and displaying, on a display of the central server computer, the visualization data structure of the dynamic chain of linked transactions to facilitate identification of fraudulent transactions in the dynamic chain of linked transactions.

18. The method of claim 17, further comprising:

receiving a selection of a particular transaction shown in the visualization data structure as being fraudulent; and in response to receiving the selection, automatically adding at least one identity associated with the particular transaction to a negative list database.

19. The method of claim 17, wherein the first plurality of identities includes information specific to the first transaction including at least one of a username, a billing address, a shipping address, a payment card account number, a phone number, a device identifier, and an email address.

20. The method of claim 17, further comprising:

storing the visualization data structure and other the visualization data structures in a visualization database; and dynamically updating the visualization data structure of the plurality of transactions in the visualization database with a new transaction received from one of the plurality of merchant computers by adding the new transaction to the visualization data structure.

* * * * *